No. 658,313. Patented Sept. 18, 1900.
J. A. BERNARDI.
COMBINED PIPE CAP AND PLUG.
(Application filed Mar. 1, 1900.)

(No Model.)

Witnesses:

Inventor:
J. A. Bernardi
By James J. Kelly,
Attorney

UNITED STATES PATENT OFFICE.

JOSEPH A. BERNARDI, OF SALEM, OREGON, ASSIGNOR OF ONE-HALF TO MARK SKIFF, OF SAME PLACE.

COMBINED PIPE CAP AND PLUG.

SPECIFICATION forming part of Letters Patent No. 658,313, dated September 18, 1900.

Application filed March 1, 1900. Serial No. 6,994. (No model.)

*To all whom it may concern:*

Be it known that I, JOSEPH A. BERNARDI, a citizen of the United States, residing at Salem, in the county of Marion and State of Oregon, have invented new and useful Improvements in a Combined Pipe Cap and Plug, of which the following is a specification.

My invention relates to means for stopping or closing the ends of pipes and pipe-fittings and contemplates the provision of a combined pipe cap and plug, the same being formed in one piece of suitable metal and susceptible of being turned on or screwed into the end of a pipe or pipe-fitting, as occasion demands.

With the foregoing in mind the invention will be fully understood from the following description and claim when taken in conjunction with the annexed drawings, in which—

Figure 1:
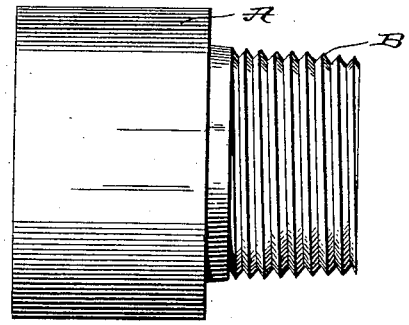
Figure 2:
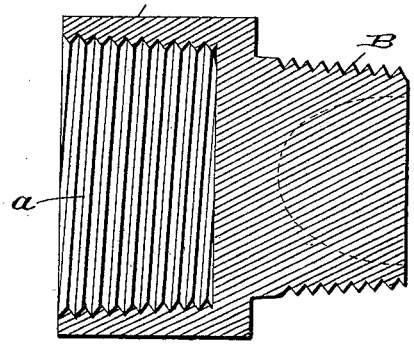

Figure 1 is a side elevation of my one-piece combined cap and plug. Fig. 2 is a diametrical section of the same.

Similar letters designate corresponding parts in both views of the drawings.

My combined pipe cap and plug is, as before stated, formed in one piece of steel or other suitable metal and comprises a portion A, of circular form in cross-section, and a comparatively-reduced portion B, also of circular form in cross-section. This reduced portion B is exteriorly threaded and tapered or gradually reduced in diameter from a point adjacent to its inner end to its outer end. It may be solid, as shown by full lines, or chambered and provided with a central partition, as shown by dotted lines. The exterior of the portion A of the cap and plug is preferably made of circular form in cross-section for the engagement of pipe-tongs; but while I prefer to make it circular I desire it understood that it may, if desired, be octagonal, hexagonal, rectangular, or of any other suitable shape in cross-section without departing from the scope of my invention. Said portion A is provided with a threaded socket $a$, which is tapered or gradually reduced in diameter from its outer to its inner end and is adapted to receive the exteriorly-threaded end of a pipe of the same diameter as that into which the plug portion B is designed to be turned.

In using my improved combined device when the interiorly-threaded end of a pipe or pipe-fitting is to be plugged the tapered portion B of the device is inserted in said end and the device is turned through the medium of pipe-tongs, a wrench, or other implement applied to the portion A until by reason of the taper of the portion B and the corresponding interior of the pipe or pipe-fitting a tight closure of said pipe or pipe-fitting is effected. On the other hand, when the exteriorly-threaded and tapered end of a pipe or pipe-fitting is to be capped the portion A of the combined device is screwed on said end until by reason of its tapered bore the pipe or pipe-fitting is tightly closed.

It will be appreciated from the foregoing that my improved combined device is adapted to serve all the purposes of the separate caps and plugs at present in use and that when the adjacent ends of the two pipes of a common diameter are to be plugged and capped, respectively, the device may be made to serve the additional function of a connection between said pipes. Also, by simply drilling a hole through its longitudinal center the device may be readily converted into an extension-piece when one is needed.

Having thus described my invention, what I claim is—

As an improved article of manufacture, the herein-described combined cap, plug and connection for pipes of a common diameter, formed in one piece, and comprising the portion A having the threaded socket tapered or gradually reduced in diameter from its outer to its inner end, and the comparatively-small portion B of circular form in cross-section, exteriorly threaded and tapered from a point adjacent to the portion A, to its outer end, as and for the purposes set forth.

In testimony whereof I have hereunto set my hand in presence of two subscribing witnesses.

JOSEPH A. BERNARDI.

Witnesses:
W. C. TILLSON,
W. H. WILD.